Nov. 15, 1938.   J. C. SANDERS   2,136,825
AIRCRAFT GUN MOUNT SUPPORTED INDEPENDENTLY OF ENCLOSURES THEREFOR
Original Filed Oct. 7, 1934
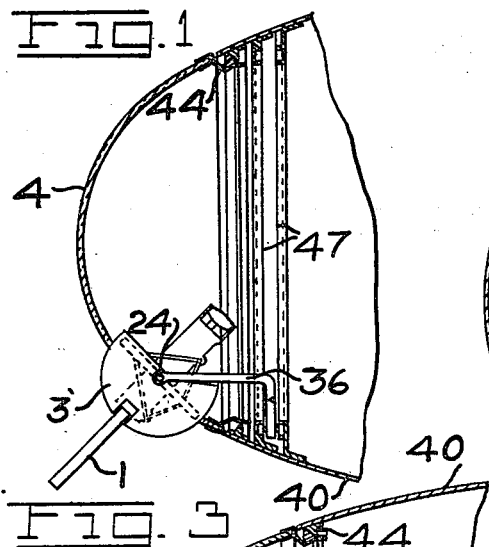
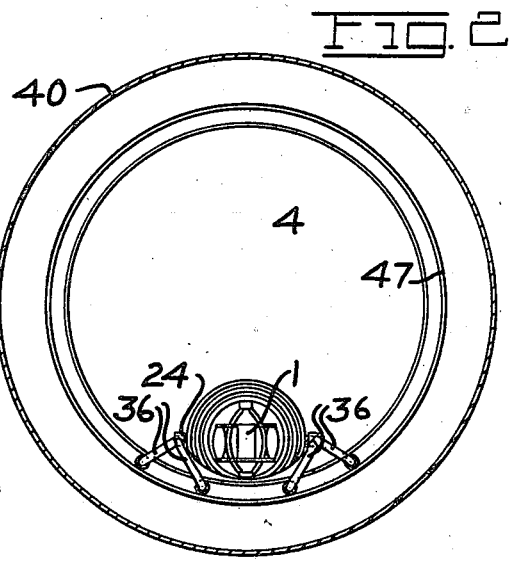
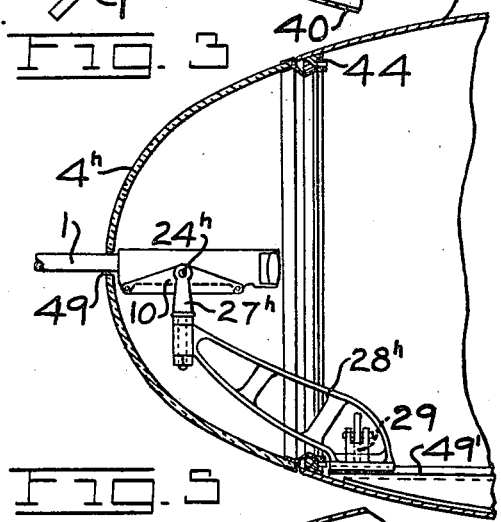
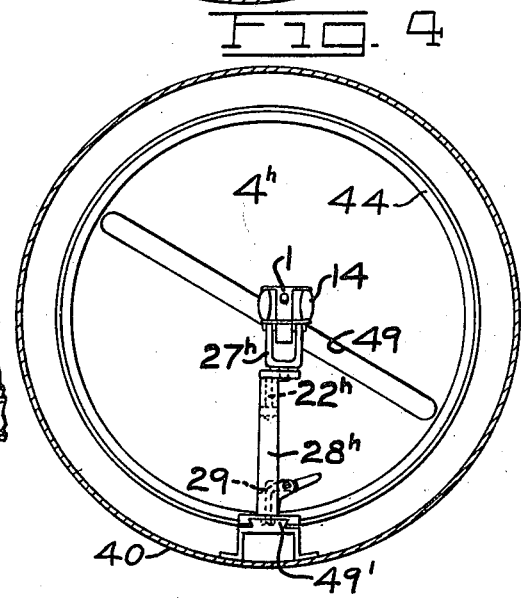
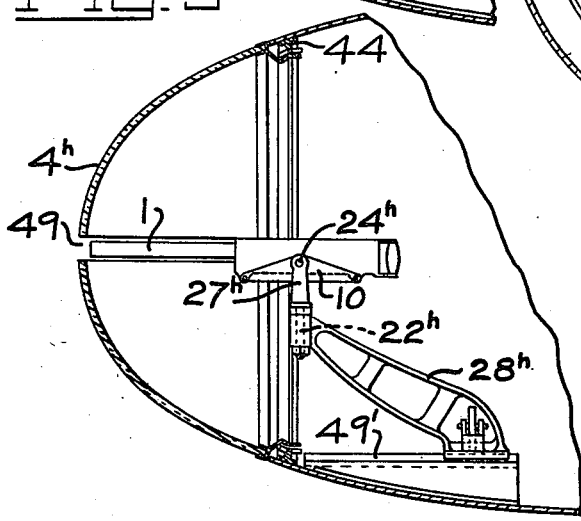
Inventor
John C. Sanders
By Charles L. Reynolds
Attorney Patented Nov. 15, 1938

2,136,825

UNITED STATES PATENT OFFICE 2,136,825

AIRCRAFT GUN MOUNT SUPPORTED INDEPENDENTLY OF ENCLOSURES THEREFOR

John C. Sanders, Seattle, Wash., assignor to Boeing Aircraft Company, Seattle, Wash., a corporation of Washington Original application October 7, 1934, Serial No. 749,040. Divided and this application December 21, 1936, Serial No. 116,917

14 Claims. (Cl. 89—37.5)

My invention relates to an aircraft gun emplacement, and more particularly to a mounting for machine guns or other ordnance primarily for use upon airplanes, although such a mounting could be used upon lighter-than-air craft. This application is a division of my application Serial No. 749,040, filed October 7, 1934.

My invention is particularly intended for installation in high speed airplanes such as bombing planes, in which it is desirable to have the gun mount and the gunner enclosed to as great an extent as possible, both to avoid any appreciable increase in the air resistance of the aircraft and to permit the gunner to work effectively by shielding him from exposure to the air flow.

More specifically it is my object in a gun emplacement to provide a structure which will afford such protection without adding appreciably to the weight or complicating the conventional structure of an airplane. To accomplish this object I propose to support the gun mount from the fuselage proper separately from the protective shell and its support, so that the shell structure itself need not be of heavy construction to support the weight of the gun and gun mount, or to withstand the stresses created by recoil of the gun, since both of these will be transmitted directly to the fuselage.

To increase further, the aerodynamic efficiency of such a gun emplacement, as an object of my invention I provide a construction which will enable the gun to be withdrawn entirely from the air stream to a position within the shell protecting the gun mount and the gunner, so that even the resistance created by the gun barrel may be eliminated when the gun is not in operation.

Other objects of my invention which are inherent in the particular type of construction which I employ will appear from a study of the specification, in conjunction with the accompanying drawing, which shows illustrative forms of my device.

My invention here described, and defined in the appended claims, pertains not so much to the type of enclosure for the gun mount and gunner or to the particular type of gun or gun mount employed as it does to the manner in which the gun mount is supported from and is movable with relation to the aircraft structure, and in the manner in which the gun mount support cooperates with particular types of enclosures.

The drawing shows exemplary types of gun mount supports largely in diagrammatic illustrations, and these may be modified according to the requirements of particular installations, while still utilizing the same principles in structure falling within the definitions of the claims appended to this specification.

Figure 1 is a longitudinal section, and Figure 2 a transverse section from the inside looking forward, of the nose portion of an airplane fuselage incorporating my invention.

Figures 3 and 4 correspond to Figures 1 and 2, respectively, illustrating a modified form of my gun mount support, and Figure 5 is a view corresponding to Figure 3 of this same form, showing the gun, gun mount, and support for the latter in fully retracted position.

In modern aircraft armament some at least of the machine guns employed are of larger caliber than formerly was thought to be feasible. It had always been customary to use no larger than .30 caliber machine guns, but for better protection .50 caliber machine guns are now sometimes used. Such guns are not only of greater weight, but they set up recoil stresses which are considerably greater than those created by the smaller types of guns. Accordingly the gun mount and the supporting structure therefor must be made correspondingly heavier and more rigid.

In a high speed airplane, however, it is essential that a gun be as mobile as possible. Where a protecting shield is employed to move with the gun, this shield, although usually of fairly large size, must also be readily movable in order not to impede the facility of movement of the gun. If the gun mount is supported directly from such an enclosure, however, the latter must be built both to support the weight of the gun and to withstand the recoil stresses set up thereby. If in addition to this the gun is supported upon the enclosure in an eccentric position, a counterweight will ordinarily be employed, as shown in Figure 6 of my application Serial No. 749,040, referred to above. Because of its considerable weight the enclosure for the gun, especially where a large caliber gun is employed, will have an inertia which may seriously hamper the gunner in aiming the gun quickly.

As a solution to these difficulties I propose to support the gun mount and the gunner directly from the fuselage, although the mount may still be protected by a rotative enclosure. The latter can then be made of comparatively light construction, and need not be counterweighted. Thus in Figures 1 and 2 I have shown the gun 1 projecting from the shell 4, which is rotatively mounted upon the airplane fuselage 40 through a track 44. That portion of the fuselage 40 adjacent to the base of the shell also acts as a support for the gunner when operating the gun. The gun mount is pivoted at 24 upon a bracket 36 which is supported in and guided for movement about the peripheral track 47, secured to the fuselage 40 behind the track 44 for the shell. Thus the gun mount and the shell are independently supported from the airplane fuselage, so that neither the weight nor the recoil stresses of the gun and the gun mount are transmitted to or through the shell 4 or its supporting means.

The shell 4, of substantially hemispherical shape, is mounted to rotate about an axis normal to the base through its center, which may correspond to the longitudinal axis of the fuselage. The shell is provided with a circular aperture disposed eccentrically of its rotative axis, which receives a gun shield 3, preferably of spherical shape, surrounding the gun mount and tiltable with respect to the shell on the axis 24. Since this axis is disposed substantially in the surface of the shell, a close fit can be made between the sphere 3 and shell 4, so that as the gun mount support is moved about the track 47 to afford orbital movement of the gun mount, the shell 4 is likewise rotated.

The gun mount itself is preferably substantially the same as that shown in Figures 1 to 5 inclusive of my application Serial No. 749,040, in which the gun is supported for both traversing and elevational swinging movement, and in addition for rotation about its longitudinal axis.

It will be seen that since whenever the bracket 36 is rotated about the track 47 the shell 4 must rotate therewith, the conjoint movement of these two elements is precisely the same as though the pivot 24 were actually fixed to the shell, except that, as previously mentioned, the weight and recoil stresses of the gun are transmitted through the bracket 36, instead of through the shell and its supporting means. In all positions, of course, the gun shield 3 will tilt about the axis 24 with respect to the shell, but since this shield is of spherical shape the shell aperture will be closed for all its rotative positions. Likewise the gun may be traversed along the sphere slot, as it would were the gun mount supported from the shell rather than from the aircraft structure directly. By rotating about its longitudinal axis the gun can be kept always upright, as otherwise the feed means and the means to collect the discharged cases and links might not function properly.

In Figures 3 to 5 inclusive also the shell $4^h$ is mounted to rotate with respect to the fuselage and gunner's support 40 upon a track 44, in the same manner as it does in connection with Figures 1 and 2. Instead of being provided with an eccentrically disposed aperture, however, in this modification the shell merely has a great circle slot 49 extending substantially from side to side of the shell, through which the gun 1 may project. This arcuate slot 49 defines in every rotative position of the shell plane normal to the shell's base or to the plane of the track 44.

The gun mount 10 employed is tiltable for elevational movement about an axis $24^h$ upon a yoke $27^h$, and this yoke in turn is pivoted for traversing movement upon an axis $22^h$ in a bracket $28^h$. Thus when the gun is supported as shown in Figure 3 a universal movement may be accomplished, so that for all rotative positions of the shell $4^h$ the gun may be moved along the slot, although in doing so the gun may be pivoted to some extent about both axes, as would be the case, for example, were the gun moved along the slot with the shell $4^h$ in the position shown in Figure 4. The shell $4^h$ is so mounted that, except when the gun projects through the slot precisely axially of the shell, slight pressure of the gun against the edge of the slot 49 will rotate the shell about its axis. Thus conjoint movement of the gun and shell may be effected with substantially the same ease as the gun alone may be moved.

While bracket $28^h$ may be fixed in the forward position shown in Figure 3, so that the gun always projects through the slot 49, and the shell, by reason of this engagement, always follows the movements of the gun, it will be preferable that the arm $28^h$ also be movable longitudinally with respect to the fuselage 40 upon a track 49'. The bracket may be held with relation to the track, for instance in advanced position with the gun projecting through the slot, or in retracted position with the gun withdrawn completely into the shell $4^h$, by a dog 29' carried by the arm $28^h$. With the gun withdrawn entirely into the streamline shape, as shown in Figure 5, all possible drag is avoided, and yet, if care is taken, the gun may still be fired through the slot 49 while it is in this retracted position. When withdrawn from the slot, however, the gun barrel will no longer engage the shell at the edge of the slot to motivate it for rotational movement as the gun is tilted or swung, but if desired, arrangements may be made to effect appropriate rotation of the shell by swinging of the gun even when it is not engaged in the shell slot.

What I claim as my invention is:

1. In an aircraft body having an opening therein, a substantially hemispherical shell closing such opening and having a great circle slot bisecting such shell and extending substantially to the shell base at each end, means supporting said shell directly from the aircraft body and guiding it for rotation through a complete circle with respect thereto about an axis through the center of its base, a bracket supported from the aircraft structure independently of said shell and shell supporting means, and a gun mount supported by said bracket for movement of a gun supported thereby along said slot and with respect to said bracket in every rotative position of said shell.

2. The combination of claim 1, and a track supported in the aircraft structure extending normal to the opening, and guiding the bracket for movement therealong, to retract the bracket and gun mount for withdrawal of the gun from the shell slot into the shell.

3. The combination of claim 1, and a track supported in the aircraft structure extending normal to the opening, and guiding the bracket for movement therealong, to retract the bracket and gun mount for withdrawal of the gun from the shell slot into the shell, and means operable to lock the bracket against movement along the track.

4. In an aircraft structure having a planar circular opening therein, a shell, in the form of a body of revolution about an axis normal to such opening through its center, closing such opening, and having an aperture therein disposed eccentrically of its generating axis, means supporting said shell directly from the aircraft structure and guiding it for rotation with respect to such structure about its generating axis, a track mounted on the aircraft structure and extending peripherally about the margin of said opening, a carriage guided for movement along said track, a bracket carried by said carriage and projecting into said shell, and a gun mount adapted to support a gun projecting through such shell aperture, and mounted on said bracket for rotation therewith and with said shell, to maintain the gun projecting through the shell aperture for various rotative positions of the shell.

5. In an aircraft structure having an opening therein, a shell in the form of a body of revolution closing such opening, and having an aperture therein disposed eccentrically of its generating axis, shell supporting means supporting the shell directly from the aircraft structure and guiding it for rotation with respect to such structure, a gun shield closing such shell aperture, a gun mount disposed behind said gun shield and adapted to support a gun projecting through said shield, and a bracket, supported from said aircraft structure independently of said shell supporting means, supporting said gun shield and said gun mount for conjoint rotation with said shell to maintain the gun projecting through said shield and the shield in registry with the shell aperture for various rotative positions of the shell.

6. In an aircraft structure having a planar circular opening therein, a shell, in the form of a body of revolution about an axis normal to such opening through its center, closing such opening, and having a circular aperture therein disposed eccentrically of its generating axis, shell supporting means supporting the shell directly from the aircraft structure and guiding it for rotation with respect to such structure about its generating axis, a sphere received in and closing such shell aperture, a bracket, supported from said aircraft structure independently of said shell supporting means, supporting said sphere for rotation with said shell to maintain the sphere in registry with the shell aperture for various rotative positions of the shell, and a gun mount supported by said bracket for elevational and traversing movement with respect to said bracket, and adapted to support a gun projecting from said sphere.

7. The combination of claim 6, and a track mounted on the aircraft structure and extending peripherally about the margin of the aircraft structure opening, and a carriage, guided for movement along said track, supporting the bracket from the aircraft structure.

8. In an aircraft body terminating at one end in an opening disposed transversely of the longitudinal axis of the body, an apertured shell constituting a terminal closure for such opening, a gun mount to support a gun projecting through the shell aperture, means supporting said gun mount directly from the aircraft body and independently of said shell and guiding said gun mount for movement with respect to the aircraft body, means supporting said shell directly from the aircraft body and guiding it for free and unrestrained movement with respect to the aircraft body, and means to transmit movement of a gun carried by said gun mount to said shell to motivate said shell by movement of said gun as the latter is moved in aiming.

9. In an aircraft body having a circular opening therein, an apertured shell having a circular base closing such opening, a gun mount to support a gun projecting through the shell aperture, a gun mount supporting bracket extending from the periphery of the shell base radially inward, a track secured to the aircraft body at the periphery of the shell base, and a carriage carrying said bracket and guided for movement along said track.

10. In an aircraft body terminating in a planar, circular opening extending transversely of the direction of flight, a substantially hemispherical shell constituting a terminal closure for such aperture in continuation of the aircraft body, means supporting said shell directly from the aircraft body and guiding it for rotation through a complete circle with respect thereto about an axis perpendicular to its terminus, a gun mount to support a gun projecting from said shell, and means, independent of said shell supporting means, supporting said gun mount for projection of a gun through said shell in every rotative position thereof, and guiding it for rotation of the gun's muzzle through a complete circle about the shell's rotative axis, during the specified rotation of the shell.

11. In an aircraft structure having an opening therein, a shell, in the form of a body of revolution closing such opening and rotatable through 360° about an axis normal to such opening through its center, and having an aperture therein disposed eccentrically of its generating axis, shell supporting means supporting the shell directly from the aircraft structure and guiding it for rotation about such axis with respect to such structure, a bracket supported from said aircraft structure independently of such shell supporting means, a gun mount constituting a universal swivel supported from said bracket for tilting of the gun mount and gun in traverse and elevation, in any rotated position, and disposed always with its swivel center in the median plane of said shell passing through the eccentric aperture, and means guiding said bracket for orbital revolution through 360° with said shell to maintain the gun projecting through the shell for various rotative positions of the shell.

12. In an aircraft structure terminating at one end in an opening disposed transversely of the longitudinal axis of the structure, a shell in the form of a body of revolution about such longitudinal axis closing such opening, and having an aperture therein disposed eccentrically of its generating axis, shell supporting means supporting the shell directly from the aircraft structure and guiding it for rotation about such longitudinal axis with respect to such structure, a gun mount constituting a universal swivel, and adapted to support a gun projecting through such shell aperture, a bracket, supported from said aircraft structure independently of said shell supporting means, supporting said gun mount with its swivel center always in the median plane of said shell passing through its eccentric aperture, and means guiding said bracket for orbital rotation with said shell to maintain the gun projecting through the shell aperture for various rotative positions of the shell.

13. In an aircraft body terminating in a complete and uninterrupted opening which is substantially circular, and which is disposed transversely to the body's longitudinal axis, an apertured shell having a circular base closing such opening, and rotatively mounted relative to the body, a gun mount to support a gun projecting through the shell's aperture, and means on the body supporting the gun mount for movement of the gun, including its bodily displacement, with and relative to the shell.

14. In an aircraft structure having a planar circular opening therein, a shell, in the form of a body of revolution about an axis normal to such opening through its center, closing such opening, and having an aperture therein disposed eccentrically of its generating axis, means supporting said shell directly from the aircraft structure and guiding it for rotation with respect to such structure about its generating axis, a track mounted on the aircraft structure and extending peripherally about the margin of said opening, a carriage guided for movement along said track, a bracket carried by said carriage and projecting into said shell, and a gun mount, mounted on said bracket for rotation therewith and with said shell, adapted to support and maintain a gun projecting through such shell aperture for various rotative positions of the shell, and means to support the gun from the bracket for rotation about its own longitudinal axis.

JOHN C. SANDERS.